(12) United States Patent
Cho

(10) Patent No.: US 9,923,449 B2
(45) Date of Patent: Mar. 20, 2018

(54) DAMPING APPARATUS AND DAMPING METHOD OF CONVERTER SYSTEM

(71) Applicant: LSIS CO., LTD., Gyeonggi-do (KR)

(72) Inventor: Byung-Geuk Cho, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/353,891

(22) Filed: Nov. 17, 2016

(65) Prior Publication Data

US 2017/0317606 A1 Nov. 2, 2017

(30) Foreign Application Priority Data

Apr. 28, 2016 (KR) .................. 10-2016-0052090

(51) Int. Cl.
 *H02J 1/02* (2006.01)
 *H02M 1/12* (2006.01)
(52) U.S. Cl.
 CPC ..................... *H02M 1/12* (2013.01)
(58) Field of Classification Search
 CPC ................ H02M 1/12; H02M 1/4266; H02M 2001/123; H02M 1/14; H02M 7/5395; H02M 7/527; H02J 3/01
 USPC ............................................ 363/39–41, 132
 See application file for complete search history.

(56) References Cited

U.S. PATENT DOCUMENTS

| 8,553,434 B2* | 10/2013 | Coccia | H02J 3/01 363/40 |
| 2008/0278977 A1* | 11/2008 | Serpa | H02M 1/12 363/39 |
| 2012/0287683 A1* | 11/2012 | Routimo | H02J 3/12 363/40 |

FOREIGN PATENT DOCUMENTS

| JP | 3650565 B2 | 5/2005 |
| JP | 2013-225988 A | 10/2013 |
| KR | 10-0973658 B1 | 8/2010 |
| KR | 10-1424317 B1 | 8/2014 |

OTHER PUBLICATIONS

Dahono, "A Control Method for DC-DC Converter That Has an LCL Output Filter Based on New Virtual Capacitor and Resist Concepts", 35th Annual IEEE Power Electronics Specialists Conference, pp. 36-42, Germany, 2004.

(Continued)

*Primary Examiner* — Nguyen Tran
(74) *Attorney, Agent, or Firm* — K&L Gates LLP

(57) ABSTRACT

The present disclosure relates to a damping apparatus of a converter system, which compensates an input voltage reference being transmitted to a converter to damp an output current of a harmonic filter that is connected between an output end of the converter and a system, including a voltage reference compensation unit configured to compensate for the input voltage reference using a ratio between inductances of inductors included in the harmonic filter; a capacitor voltage value compensation unit configured to compensate for a voltage value of a capacitor included in the harmonic filter using the ratio between the inductances of the inductors; and a voltage reference generation unit configured to generate a final voltage reference by subtracting the compensated voltage value of the capacitor from the compensated input voltage reference.

9 Claims, 6 Drawing Sheets

(56) References Cited

OTHER PUBLICATIONS

Adaptive Active Damping Scheme of LCL Filter Resonance under Inductance Variation for a Single-Phase Grid-Connected Inverter, Aug. 2015.

* cited by examiner

PRIOR ART

PRIOR ART

DAMPING APPARATUS AND DAMPING METHOD OF CONVERTER SYSTEM

CROSS REFERENCE TO RELATED APPLICATION

This application claims the benefit of Korean Patent Application No. 10-2016-0052090, filed on Apr. 28, 2016, entitled "DAMPING APPARATUS AND DAMPING METHOD OF CONVERTER SYSTEM", which is hereby incorporated by reference in its entirety into this application.

BACKGROUND

1. Technical Field

The present disclosure relates to a damping apparatus and a damping method of a converter system, and more particularly, to a damping apparatus and a damping method of a converter system, which compensate for an input voltage reference being delivered to a converter and a voltage value of a capacitor included in a harmonic filter using a ratio between inductances of inductors included in the harmonic filter. Further, the present disclosure relates to a damping apparatus and a damping method of a converter system, which perform a damping operation of a converter system by subtracting a compensated capacitor voltage value from a compensated input voltage reference and generating a final voltage reference, to thereby control a converter.

2. Description of the Related Art

A grid-connected converter is a device that forms a direct current (DC) voltage at a capacitor so-called as a system voltage DC link from a three-phase alternating current (AC) system voltage, and is a component which is widely used in a regenerative motor drive driver, a grid-connected wind power generator and the like. Particularly, in the grid-connected converter, an inverter of an electric generator or an electric motor generates amplitude and a frequency of an AC voltage for attaining a control purpose using a DC link voltage.

Such a grid-connected converter requires a harmonic filter so as to limit effectively current harmonics of a switching frequency band through a pulse width modulation (PWM) that is a voltage synthesis method. Generally, in order to minimize a dimension of a filter, a grid-connected converter typically employs an inductor-capacitor-inductor (LCL) filter in which two inductors and a single capacitor are coupled to each other.

FIG. 1 is a graph illustrating an output current according to a frequency of a current being input to an LCL filter.

As shown in FIG. 1, the LCL filter may have a characteristic in which an impedance of the LCL filter becomes very low at a specific frequency, or a resonance phenomenon may occur in the LCL filter, wherein the resonance phenomenon is a phenomenon in which a current output from the LCL filter diverges due to an abrupt change of a generated electric power, and the like.

Due to such a characteristic and/or a phenomenon, when disturbance such as the rising and falling of a spontaneous voltage occurs at a system voltage being linked to a grid-connected converter, or a change of an operating condition occurs, step variation of an LCL filter input voltage is generated. As a result, instability of a current control of the grid-connected converter is increased.

To address instability of a grid-connected converter due to an LCL filter, a passive damping method and an active damping method have been proposed.

A passive damping method adds a resistor to a capacitor end of an LCL filter to attenuate a resonance phenomenon, and has an advantage of simply attenuating the resonance phenomenon. The passive damping method, however, has a disadvantage in which a dimension and a manufacturing cost of a converter system are unnecessarily increased due to an adding of the resistor and such an added resistor. Also, in a performance aspect of the converter system, a loss is generated due to an added resistance component, and thus there is a disadvantage in which degradation of a performance and efficiency of the filter is generated.

On the other hand, an active damping method virtually implements a resistor through a modification of a current controller without a physical loss, so that there is an advantage in which a loss is not generated. When virtually implementing a resistor, such an active damping method performs an active damping using information related to a current flowing at a capacitor of an LCL filter or information related to a voltage of the capacitor thereof.

At this point, an active damping method using information related to a current flowing at a capacitor of an LCL filter has a disadvantage in which an expensive current sensor should be provided so as to acquire the information related to a current. On the other hand, an active damping method using information related to a voltage of a capacitor of an LCL filter has an advantage in which an inexpensive voltage sensor is used. Such an active damping method, however, should differentiate the information related to a voltage instead of the information related to a current when virtually implementing a resistor using the information related to a voltage, and thus there is a problem in that a noise component is amplified when implementing a differential term to cause difficulty in securing control stability.

SUMMARY

An object of the present disclosure is directed to prevent a resonance phenomenon occurring at a harmonic filter by compensating for an input voltage reference being transmitted to a converter and a voltage value of a capacitor included in the harmonic filter using a ratio between inductances of inductors included in the harmonic filter, and subtracting a compensated voltage value of the capacitor from a compensated input voltage reference to generate a final voltage reference.

The object of the present disclosure is not limited to the above described object, and other objects and advantages not mentioned above will be understood in the art from the following description and also will be apparently understood by an embodiment of the present disclosure. Also, it will be easily understood that the object and advantages of the present disclosure described herein may be implemented by means and a combination thereof defined by the appended claims.

To attain the object described above, a damping apparatus of a converter system, which compensates an input voltage reference being transmitted to a converter to damp an output current of a harmonic filter that is connected between an output end of the converter and a system, includes a voltage reference compensation unit configured to compensate for the input voltage reference using a ratio between inductances of inductors included in the harmonic filter; a capacitor voltage value compensation unit configured to compensate for a voltage value of a capacitor included in the harmonic filter using the ratio between the inductances of the inductors; and a voltage reference generation unit configured to generate a final voltage reference by subtracting the compensated voltage value of the capacitor from the compensated input voltage reference.

A damping method of a converter system according to the present disclosure, which compensates an input voltage reference being transmitted to a converter to damp an output current of a harmonic filter that is connected between an output end of the converter and a system, includes compensating for the input voltage reference using a ratio between inductances of inductors included in the harmonic filter by means of a voltage reference compensation unit; compensating for a voltage value of a capacitor included in the harmonic filter using the ratio between the inductances of the inductors by means of a capacitor voltage value compensation unit; and generating a final voltage reference by subtracting the compensated voltage value of the capacitor from the compensated input voltage reference by means of a voltage reference generation unit.

In accordance with the present disclosure as described above, an input voltage reference being transmitted to a converter and a voltage value of a capacitor included in the harmonic filter are compensated using a ratio between inductances of inductors included in the harmonic filter, and a final voltage reference is generated by subtracting a compensated voltage value of the capacitor from a compensated input voltage reference, and thus an active damping of the converter system may be rapidly and effectively performed using an inexpensive voltage sensor without calculating a differential term that requires for a high-performance calculation process.

DETAILED DESCRIPTION

Figure 1:
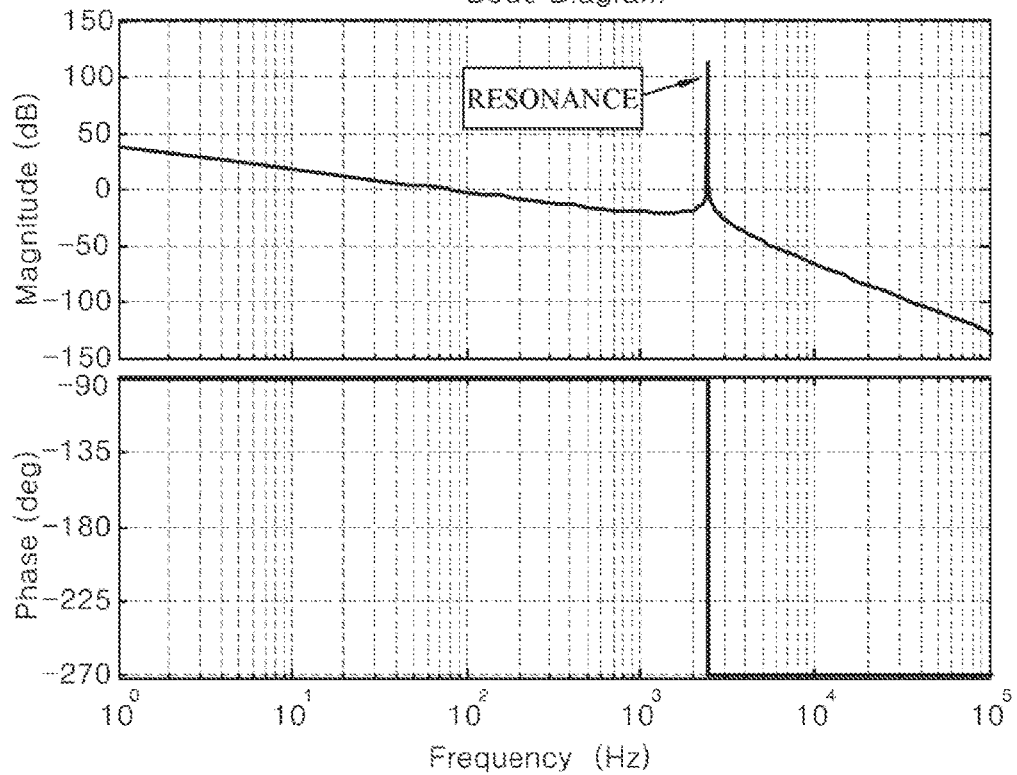
FIG. 1 is a graph illustrating an output current according to a frequency of an input voltage of an inductor-capacitor-inductor (LCL) filter provided in a conventional converter system.

The above and other objects, features and advantages of the present disclosure will be described later in detail with reference to the accompanying drawings, and thus the technical spirit of the present disclosure can be easily implemented by those skilled in the art. In the following description of the present disclosure, if a detailed description of known configurations and functions is determined to obscure the interpretation of embodiments of the present disclosure, the detailed description thereof will be omitted. Hereinafter, preferred embodiments according to the present disclosure will be described in detail with reference to the accompanying drawings. In the drawings, the same reference numerals refer to the same or similar elements throughout.

Figure 2:
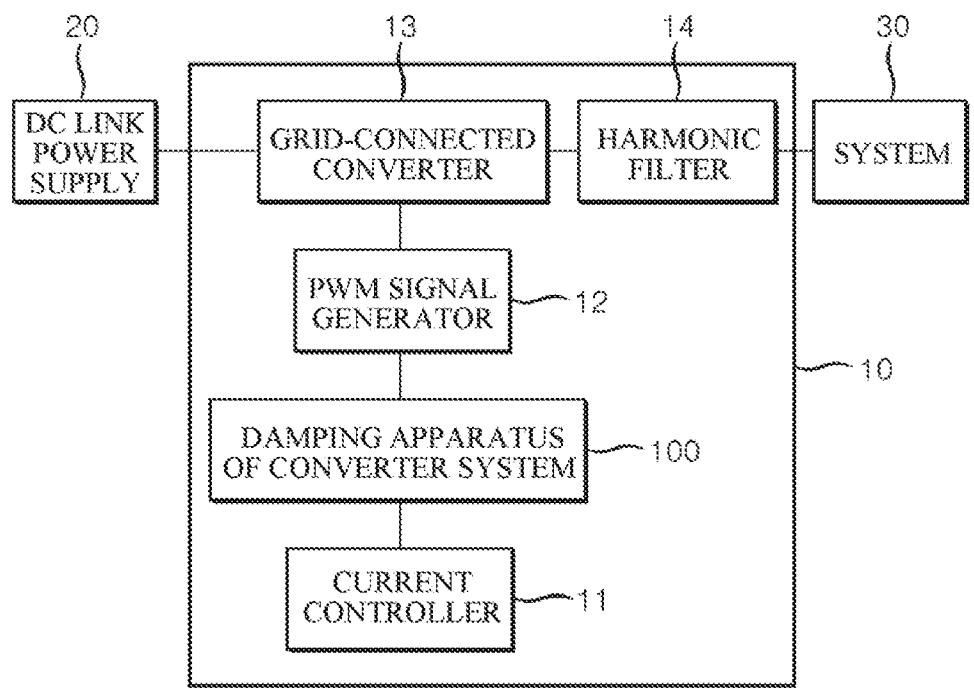
FIG. 2 is a diagram illustrating a connection configuration of a converter system provided with a damping apparatus of a converter system according to one embodiment of the present disclosure.

FIG. 2 is a diagram illustrating a connection configuration of a converter system 10 provided with a damping apparatus 100 of a converter system according to one embodiment of the present disclosure.

With reference to FIG. 2, the converter system 10 provided with the damping apparatus 100 of the converter system according to one embodiment of the present disclosure includes a current controller 11, a pulse width modulation (PWM) signal generator 12, a grid-connected converter 13, and a harmonic filter 14.

The converter system 10 may receive direct current (DC) power from a DC link power supply 20 to output an output current to an electric power system 30.

Here, the DC link power supply 20 may be an energy storage device of an electric power generation system that generates electric power using solar light, water power, nuclear power, and wind power.

More particularly, the current controller 11 of the converter system 10 may generate an input voltage reference so as to control an output voltage being output from the grid-connected converter 13, thereby transmitting the input voltage reference to the damping apparatus 100 of the converter system 10.

The damping apparatus 100 of the converter system 10 may compensate for the input voltage reference to generate a final voltage reference, and then may transmit the generated final voltage reference to the PWM signal generator 12.

At this point, the damping apparatus 100 of the converter system 10 may compensate for the input voltage reference to generate the final voltage reference so as to eliminate a resonance phenomenon occurring in the harmonic filter 14.

It will be described in detail later that the damping apparatus 100 of the converter system 10 generates the final voltage reference.

The PWM signal generator 12 may generate a PWM control signal corresponding to the final voltage reference received from the damping apparatus 100 of the converter system 10, to thereby control a switching of the grid-connected converter 13.

According to the PWM control signal generated from the PWM signal generator 12, a switching of a switching element in the grid-connected converter 13 is controlled. As such, the grid-connected converter 13 may output DC power supplied from the DC link power supply 20 as an output voltage according to the final voltage reference.

The harmonic filter 14 may filter a current harmonic wave of a switching frequency band through a PWM. Here, the harmonic filter 14 may be an inductor-capacitor-inductor (LCL) filter in which two inductors and a single conductor are connected to each other.

The harmonic filter 14 may filters the current harmonic wave to output an output current to the electric power system 30.

Figure 3:
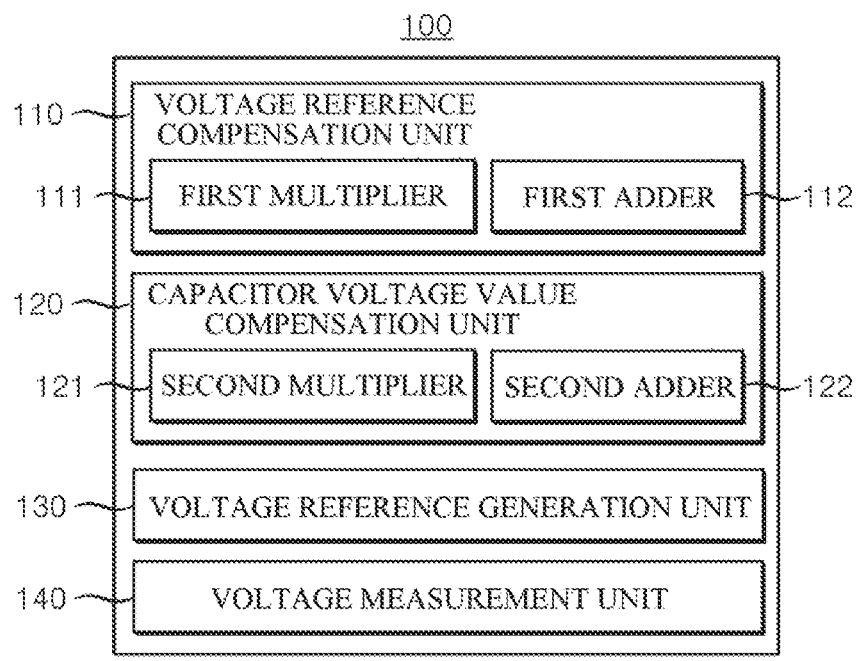
FIG. 3 is a diagram illustrating a detailed configuration of the damping apparatus of the converter system according to one embodiment of the present disclosure.
Figure 4:
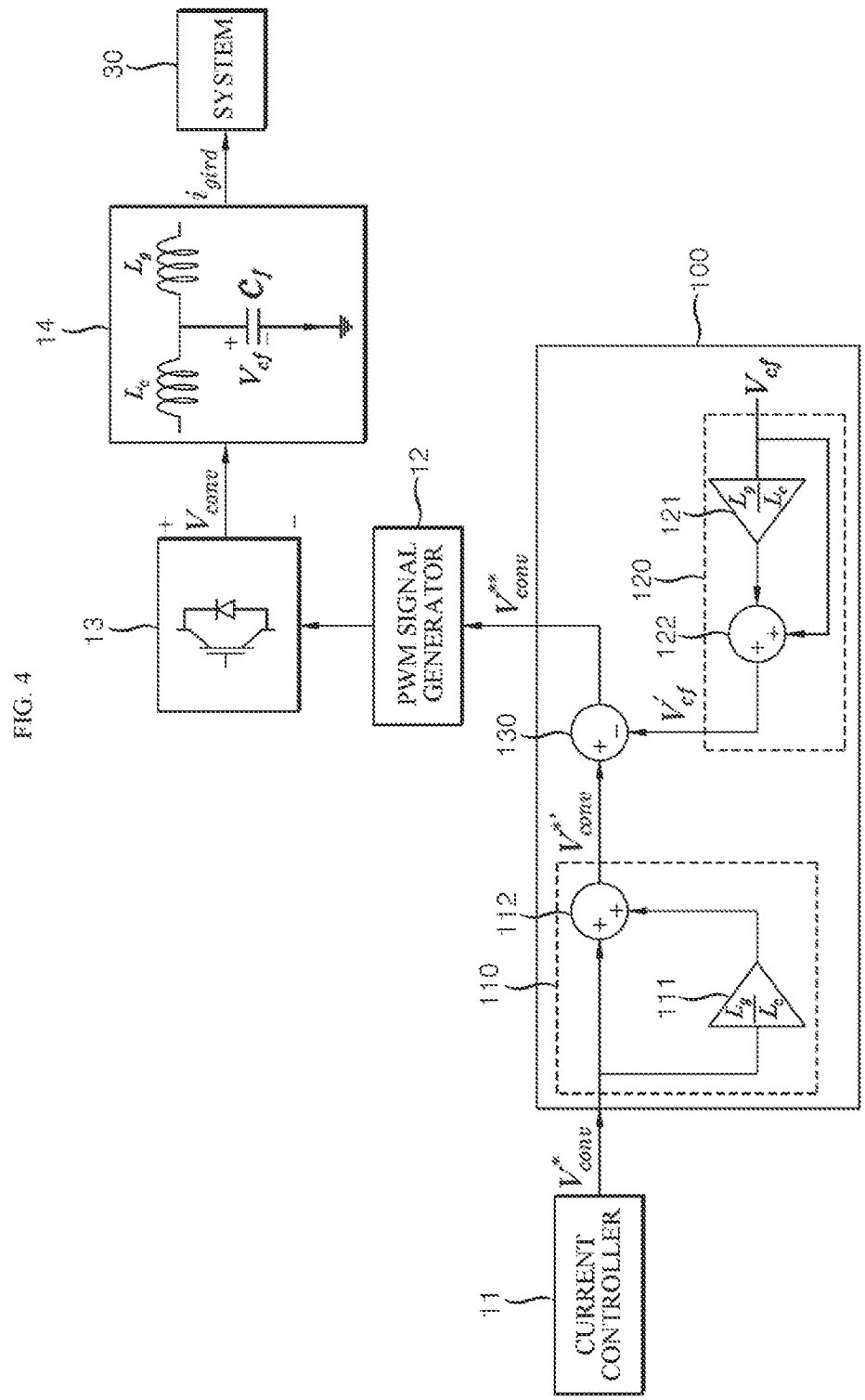
FIG. 4 is a diagram illustrating a circuit of the damping apparatus and a harmonic filter of the converter system according to one embodiment of the present disclosure.

FIG. 3 is a diagram illustrating a detailed configuration of the damping apparatus 100 of the converter system according to one embodiment of the present disclosure, and FIG. 4 is a diagram illustrating a circuit of the damping apparatus 100 and the harmonic filter 14 of the converter system according to one embodiment of the present disclosure.

With reference to FIGS. 3 and 4, the damping apparatus 100 of the converter system according to one embodiment of the present disclosure includes a voltage reference compensation unit 110, a capacitor voltage value compensation unit 120, a voltage reference generation unit 130, and a voltage measurement unit 140.

Also, the voltage reference compensation unit 110 includes a first multiplier 111 and a first adder 112, and the capacitor voltage value compensation unit 120 includes a second multiplier 121 and a second adder 122.

The voltage reference compensation unit 110 may compensate for an input voltage reference $V_{conv}^*$ transmitted from the current controller 11 so as to control an output voltage output from the grid-connected converter 13.

More particularly, the voltage reference compensation unit 110 may compensate for an input voltage reference $V_{conv}^*$ using a ratio between inductances $L_c$ and $L_g$ of inductors included in the harmonic filter 14.

Here, as described above, the harmonic filter 14 may be an LCL filter in which two inductors and a single conductor are connected to each other.

Consequently, the harmonic filter 14 may include an inductor connected to an output side of the grid-connected converter 13 and an inductor connected to the electric power system 30.

At this point, the voltage reference compensation unit 110 may compensate for the input voltage reference $V_{conv}^*$ using a ratio between an inductance $L_c$ of the inductor connected to the output side of the grid-connected converter 13 and an inductance $L_g$ of the inductor connected to the electric power system 30.

For this purpose, the first multiplier 111 of the voltage reference compensation unit 110 calculates the ratio between the inductance $L_c$ of the inductor connected to the output side of the grid-connected converter 13 and the inductance $L_g$ of the inductor connected to the electric power system 30. Thereafter, the first multiplier 111 may multiply the input voltage reference $V_{conv}^*$ by the calculated ratio.

The first adder 112 of the voltage reference compensation unit 110 may compensate the input voltage reference $V_{conv}^*$ by adding an output value of the multiplier 111 to the input voltage reference $V_{conv}^*$.

At this point, the voltage reference compensation unit 110 may compensate for the input voltage reference $V_{conv}^*$ using the following Equation 1.

$$V_{conv}^{*\prime} = V_{conv}^* + V_{conv}^* \times \frac{L_g}{L_c} \quad \text{[Equation 1]}$$

Here, $V_{conv}^{*\prime}$ is an input voltage reference after compensation, $V_{conv}^*$ is an input voltage reference before compensation, $L_c$ is an inductance of one inductor, which is connected to the output side of the grid-connected converter 13, of the inductors included in the harmonic filter 14, and $L_g$ is an inductance of the other inductor, which is connected to the electric power system 30, of the inductors included in the harmonic filter 14.

The capacitor voltage value compensation unit 120 may compensate for a voltage value $V_{cf}$ of a capacitor included in the harmonic filter 14 so as to cancel harmonic components of the harmonic filter 14.

For this purpose, the capacitor voltage value compensation unit 120 may use the ratio between the inductance $L_c$ of the inductor connected to the output side of the grid-connected converter 13 and the inductance $L_g$ of the inductor connected to the electric power system 30.

More particularly, the second multiplier 121 of the capacitor voltage value compensation unit 120 calculates the ratio between the inductance $L_c$ of the inductor connected to the output side of the grid-connected converter 13 and the inductance $L_g$ of the inductor connected to the electric power system 30. Thereafter, the second multiplier 121 may multiply the capacitor voltage value $V_{cf}$ by the calculated ratio.

Afterward, the second adder 122 of the capacitor voltage value compensation unit 120 may compensate for the capacitor voltage value $V_{cf}$ by adding an output value of the second multiplier 121 to the capacitor voltage value $V_{cf}$.

At this point, the capacitor voltage value compensation unit 120 may compensate for the capacitor voltage value $V_{cf}$ using the following Equation 2.

$$V_{cf}^{\prime} = V_{cf} + V_{cf} \times \frac{L_g}{L_c} \quad \text{[Equation 2]}$$

Here, $V_{cf}^{\prime}$ is a capacitor voltage value after compensation, $V_{cf}$ is a capacitor voltage value before compensation, $L_c$ is an inductance of one inductor, which is connected to the output side of the grid-connected converter 13, of the inductors included in the harmonic filter 14, and $L_g$ is an inductance of the other inductor, which is connected to the electric power system 30, of the inductors included in the harmonic filter 14.

Meanwhile, a damping apparatus 100 of a converter system according to another embodiment may further include an inductance measurement unit for measuring the inductances $L_c$ and $L_g$ of the inductors included in the harmonic filter 14.

The inductance measurement unit may measure the inductances $L_c$ and $L_g$ of the inductors included in the harmonic filter 14 in real time to transmit them to the first multiplier 111 and the second multiplier 121 which are described above.

Through such a process, the first multiplier 111 and the second multiplier 121 may accurately calculate the ratio between the inductances $L_c$ and $L_g$ using inductance values varying in real time.

Meanwhile, the voltage measurement unit 140 may measure the voltage value $V_{cf}$ of the capacitor included in the harmonic filter 14, and may transmit the measured capacitor voltage value $V_{cf}$ to the capacitor voltage value compensation unit 120.

Through such a process, the damping apparatus 100 of the converter system according to one embodiment of the present disclosure may damp an output current of the converter system using an inexpensive voltage sensor without employing an expensive current sensor.

The voltage reference generation unit 130 receives the compensated input voltage reference $V_{conv}^{*\prime}$ from the voltage reference compensation unit 110 and the compensated capacitor voltage value $V_{cf}^{\prime}$ from the capacitor voltage value compensation unit 120. Thereafter, the voltage reference generation unit 130 may generate a final voltage reference $V_{conv}^{**}$ by subtracting the compensated capacitor voltage value $V_{cf}^{\prime}$ from the compensated input voltage reference $V_{conv}^{*\prime}$.

At this point, the voltage reference generation unit 130 may generate the final voltage reference $V_{conv}^{**}$ using the following Equation 3.

$$V_{conv}^{**} = V_{conv}^{*'} - V_{cf}' \quad \text{[Equation 3]}$$

$$= (V_{conv}^{*} - V_{cf}) \times \left(1 + \frac{L_g}{L_c}\right)$$

Here, $V_{conv}^{**}$ is the final voltage reference, $V_{conv}^{*'}$ is an input voltage reference, $V_{cf}'$ is a capacitor voltage value after compensation, $V_{conv}^{*}$ is an input voltage reference before compensation, $V_{cf}$ is a capacitor voltage value before compensation, $L_c$ is an inductance of one inductor, which is connected to the output side of the grid-connected converter 13, of the inductors included in the harmonic filter 14, and $L_g$ is an inductance of the other inductor, which is connected to the electric power system 30, of the inductors included in the harmonic filter 14.

That is, the damping apparatus 100 of the converter system according to one embodiment of the present disclosure may compensate for the input voltage reference $V_{con}^{*}$ transmitted from the current controller 11 as the final voltage reference $V_{con}^{}$ to transmit it to the PWM signal generator 12. Through such a process, the damping apparatus 100 of the converter system may damp an output current $i_{grid}$ of the harmonic filter 14**.

Figure 5:
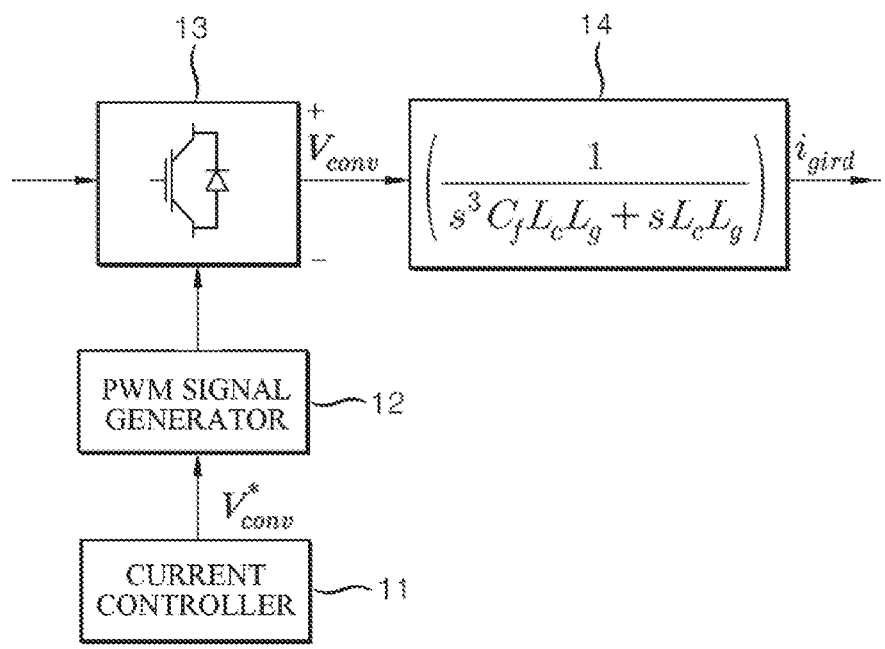
FIGS. 5 and 6 are diagrams illustrating the damping apparatus and the harmonic filter of the converter system according to one embodiment of the present disclosure as a transfer function, respectively.
Figure 6:
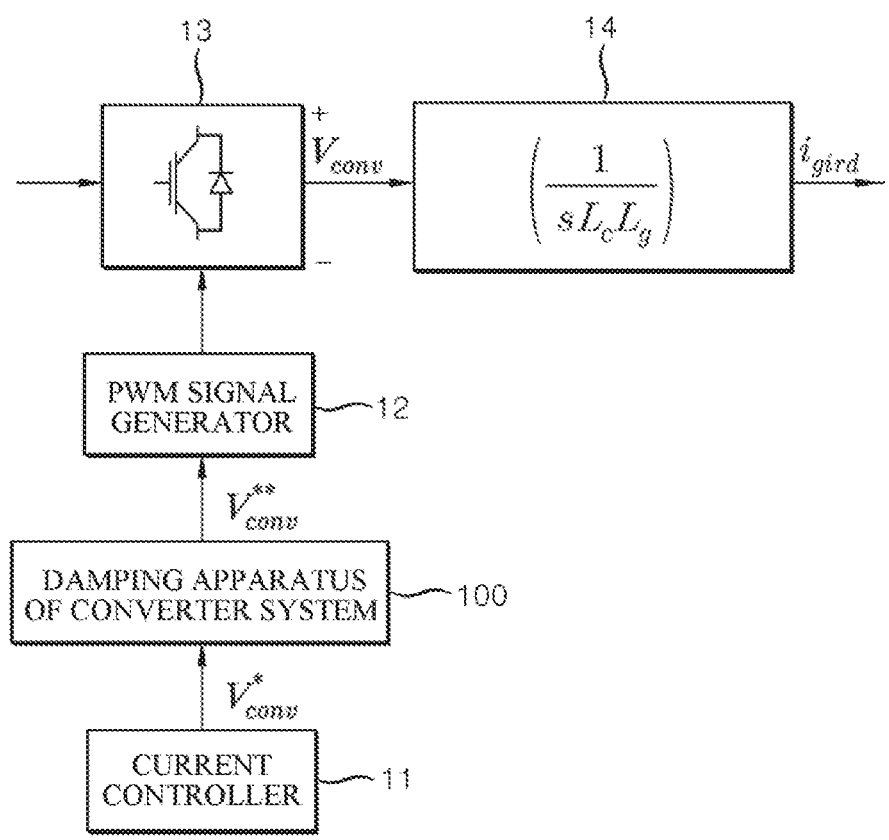

FIGS. 5 and 6 are diagrams illustrating the damping apparatus 100 and the harmonic filter 14 of the converter system according to one embodiment of the present disclosure as a transfer function, respectively.

With reference to FIG. 5, when the converter system 10 is not provided with the damping apparatus 100 of the converter system according to one embodiment of the present disclosure, it controls the grid-connected converter 13 using an uncompensated input voltage reference $V_{con}^{*}$.

At this point, a transfer function between an output voltage $V_{con}$ being output from the grid-connected converter 13 and an output current $i_{grid}$ of the harmonic filter 14 may be expressed as the following Equation 4.

$$\frac{i_{gird}}{V_{conv}} = \left(\frac{1}{s^3 C_f L_c L_g + s L_c L_g}\right) \quad \text{[Equation 4]}$$

Here, $i_{grid}$ is the output current of the harmonic filter 14. $V_{conv}$ is the output voltage of the grid-connected converter 13, s is a Laplace constant, $C_f$ is a capacitance of a capacitor included in the harmonic filter 14, $L_c$ is an inductance of one inductor, which is connected to the output side of the grid-connected converter 13, of the inductors included in the harmonic filter 14, and $L_g$ is an inductance of the other inductor, which is connected to the electric power system 30, of the inductors included in the harmonic filter 14.

By looking at Equation 4, when the grid-connected converter 13 is controlled using the uncompensated input voltage reference $V_{con}^{*}$, the transfer function includes a third component. Consequently, when a frequency of the output voltage $V_{con}$ of the grid-connected converter 13 is a frequency causing a resonance phenomenon, a resonance phenomenon occurs in the harmonic filter 14.

With reference to FIG. 6, when the converter system 10 is provided with the damping apparatus 100 of the converter system according to one embodiment of the present disclosure, it controls the grid-connected converter 13 using a compensated input voltage reference $V_{con}^{**}$.

At this point, a transfer function between an output voltage $V_{con}$ being output from the grid-connected converter 13 and an output current $i_{grid}$ of the harmonic filter 14 may be expressed as the following Equation 5.

$$\frac{i_{gird}}{V_{conv}} = \left(\frac{1}{s L_c L_g}\right) \quad \text{[Equation 5]}$$

Here, $i_{grid}$ is the output current of the harmonic filter 14, $V_{conv}$ is the output voltage of the grid-connected converter 13, s is a Laplace constant, $L_c$ is an inductance of one inductor, which is connected to the output side of the grid-connected converter 13, of the inductors included in the harmonic filter 14, and $L_g$ is an inductance of the other inductor, which is connected to the electric power system 30, of the inductors included in the harmonic filter 14.

By looking at Equation 5, when the grid-connected converter 13 is controlled using the compensated input voltage reference $V_{con}^{}$, the transfer function includes only a first component without a third component. Consequently, even though the output voltage $V_{con}$ of the grid-connected converter 13 reaches any frequency, a resonance phenomenon may not occur in the harmonic filter 14**.

As a result, the damping apparatus 100 of the converter system according to one embodiment of the present disclosure may damp accurately and effectively the output current $i_{grid}$ of the harmonic filter 14 for use in filtering the harmonic wave of the grid-connected converter 13 without a high-performance calculation process including a third component and a second component.

Although the present disclosure has been described with reference to the embodiments, it should be understood that numerous other substitutions, modifications and alterations can be devised by those skilled in the art without departing the technical spirit of this disclosure, and thus it should be construed that the present disclosure is not limited by the embodiments described above and the accompanying drawings.

What is claimed is:

1. A damping apparatus of a converter system, which compensates an input voltage reference being transmitted to a converter to damp an output current of a harmonic filter that is connected between an output end of the converter and a system, comprising:
   a voltage reference compensation unit configured to compensate for the input voltage reference using a ratio between an inductance of one inductor, which is connected to the output end of the converter, of the inductors included in the harmonic filter and an inductance of the other inductor, which is connected to the system, of the inductors included therein; a capacitor voltage value compensation unit configured to compensate for a voltage value of a capacitor included in the harmonic filter using the ratio between the inductances of the inductors; and
   a voltage reference generation unit configured to generate a final voltage reference by subtracting the compensated voltage value of the capacitor from the compensated input voltage reference,
   wherein the voltage reference compensation unit includes:
      a first multiplier configured to multiply the input voltage reference by a ratio between an inductance of one inductor, which is connected to the output end of the converter, of the inductors included in the harmonic filter and an inductance of the other inductor, which is connected to the system, of the inductors included therein; and a first adder configured to add an output value of the first multiplier to the input voltage reference, thereby compensating the input voltage reference.

2. The damping apparatus of claim 1, wherein the voltage reference compensation unit compensates the input voltage reference using the following Equation, $$V_{conv}^{*\prime} = V_{conv}^{*} + V_{conv}^{*} \times \frac{L_g}{L_c}, \quad \text{[Equation]}$$

wherein Vconv*' is an input voltage reference after compensation, Vconv* is an input voltage reference before compensation, Lc is an inductance of one inductor, which is connected to the output end of the converter, of the inductors included in the harmonic filter, and Lg is an inductance of the other inductor, which is connected to the system, of the inductors included in the harmonic filter.

3. The damping apparatus of claim 1, wherein the capacitor voltage value compensation unit includes:

a second multiplier configured to multiply the voltage value of the capacitor by a ratio between an inductance of one inductor, which is connected to the output end of the converter, of the inductors included in the harmonic filter and an inductance of the other inductor, which is connected to the system, of the inductors included therein; and a second adder configured to add an output value of the second multiplier to the voltage value of the capacitor, thereby compensating the voltage value of the capacitor.

4. The damping apparatus of claim 3, wherein the capacitor voltage value compensation unit compensates the voltage value of the capacitor using the following Equation, $$V_{cf}^{\prime} = V_{cf} + V_{cf} \times \frac{L_g}{L_c}, \quad \text{[Equation]}$$

wherein Vcf' is a voltage value of the capacitor after compensation, Vcf is a voltage value of the capacitor before compensation, Lc is an inductance of one inductor, which is connected to the output end of the converter, of the inductors included in the harmonic filter, and Lg is an inductance of the other inductor, which is connected to the system, of the inductors included in the harmonic filter.

5. The damping apparatus of claim 1, wherein the voltage reference generation unit generates the final voltage reference using the following Equation, $$V_{conv}^{**} = V_{conv}^{*\prime} - V_{cf}^{\prime} \quad \text{[Equation]}$$
$$= (V_{conv}^{*} - V_{cf}) \times \left(1 + \frac{L_g}{L_c}\right),$$

wherein Vconv** is a final voltage reference, Vconv*' is an input voltage reference after compensation, Vcf' is a voltage value of the capacitor after compensation, Vconv* is an input voltage reference before compensation, Vcf is a voltage value of the capacitor before compensation, Lc is an inductance of one inductor, which is connected to the output end of the converter, of the inductors included in the harmonic filter, and Lg is an inductance of the other inductor, which is connected to the system, of the inductors included in the harmonic filter.

6. The damping apparatus of claim 1, further comprising:

a voltage measurement unit configured to measure the voltage value of the capacitor included in the harmonic filter.

7. The damping apparatus of claim 1, wherein the converter is a grid-connected converter that is configured to receive a direct current (DC) voltage and convert the received DC voltage into a three-phase alternating current (AC) system voltage to output the three-phase AC system voltage to the system.

8. A damping method of a converter system, which compensates an input voltage reference being transmitted to a converter to damp an output current of a harmonic filter that is connected between an output end of the converter and a system, comprising:

compensating for the input voltage reference using a ratio between inductances of inductors included in the harmonic filter by means of a voltage reference compensation unit;

compensating for a voltage value of a capacitor included in the harmonic filter using the ratio between the inductances of the inductors by means of a capacitor voltage value compensation unit; and generating a final voltage reference by subtracting the compensated voltage value of the capacitor from the compensated input voltage reference by means of a voltage reference generation unit, wherein the compensating for the input voltage reference includes:

multiplying the input voltage reference by a ratio between an inductance of one inductor, which is connected to the output end of the converter, of the inductors included in the harmonic filter and an inductance of the other inductor, which is connected to the system, of the inductors included therein by means of a first multiplier; and adding an output value of the first multiplier to the input voltage reference, thereby compensating the input voltage reference by means of a first adder.

9. The damping method of claim 8, wherein the compensating for the voltage value of the capacitor includes:

multiplying the voltage value of the capacitor by a ratio between an inductance of one inductor, which is connected to the output end of the converter, of the inductors included in the harmonic filter and an inductance of the other inductor, which is connected to the system, of the inductors included therein by means of a second multiplier; and adding an output value of the second multiplier to the voltage value of the capacitor, thereby compensating the voltage value of the capacitor by means of a second adder.

* * * * *